(12) United States Patent
Demizu

(10) Patent No.: US 6,195,355 B1
(45) Date of Patent: Feb. 27, 2001

(54) PACKET-TRANSMISSION CONTROL METHOD AND PACKET-TRANSMISSION CONTROL APPARATUS

(75) Inventor: Noritoshi Demizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/160,554

(22) Filed: Sep. 24, 1998

(30) Foreign Application Priority Data

Sep. 26, 1997 (JP) ..................................... 9-261936

(51) Int. Cl.[7] .................................................. H04L 12/28
(52) U.S. Cl. .............................................. 370/397; 370/395
(58) Field of Search ..................................... 370/389, 390, 370/395, 412, 413, 428, 363, 254, 233

(56) References Cited

U.S. PATENT DOCUMENTS

| 5,132,966 | * | 7/1992 | Hayano | 370/233 |
|---|---|---|---|---|
| 5,418,781 | * | 5/1995 | Kaufman | 370/413 |
| 5,768,271 | * | 6/1998 | Seid | 370/389 |
| 5,884,064 | * | 3/1999 | Rosenberg | 370/395 |
| 5,903,559 | * | 5/1999 | Acharya | 370/254 |

\* cited by examiner

*Primary Examiner*—Douglas W. Olms
*Assistant Examiner*—Ricardo M. Pizarro
(74) *Attorney, Agent, or Firm*—Crosby, Heafey, Roach & May

(57) ABSTRACT

The invention relates to a packet-transmission control method for controlling transmission of packets, the method comprising, a judgment step of forming a judgment as to whether or not the number of queue buffers that can be used for VC merging is smaller than the number of VCs to be merged in processing to merge a plurality of virtual connections into one virtual connection, and a merging step of merging virtual connections by giving a high priority to those virtual connections in a list having a large number of virtual connections to be merged in accordance with an outcome of the judgment formed at the judgment step, and relates to a packet-transmission control apparatus for controlling transmission of packets.

8 Claims, 15 Drawing Sheets

ASP Prototype Implementation

FIG. 8
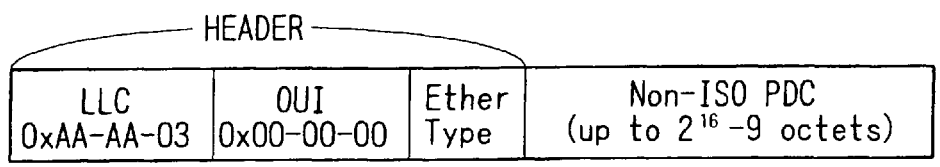
FIG. 9A
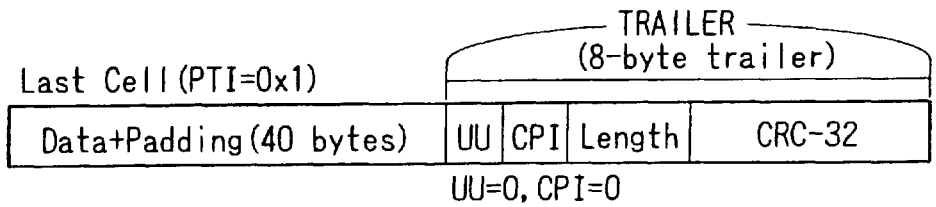
FIG. 9B
Other Cells (PTI=0x0)
| Data (48 bytes or less) |
|---|
FIG. 10
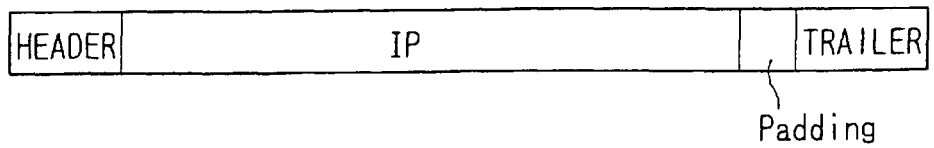
PRIOR TO DIVISION INTO CELLS NNI (Network-Network Interface)

UNI (User-Network Interface)

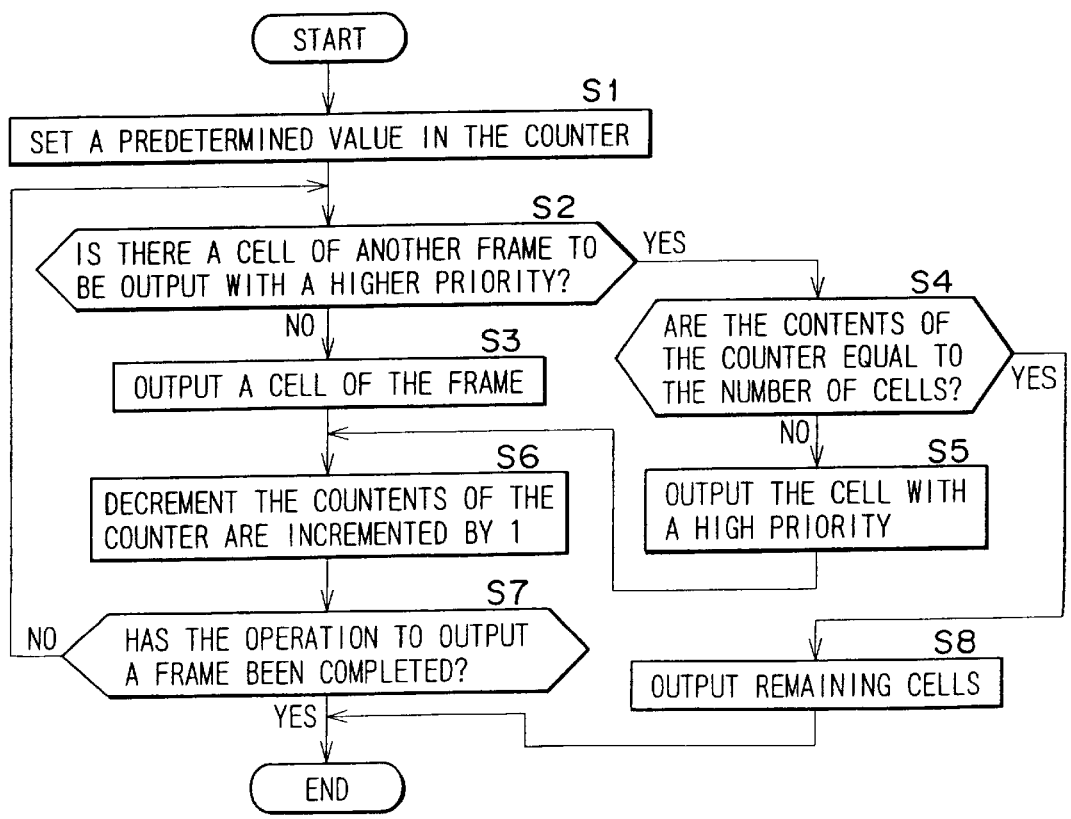

FIG. 21

| NUMBER OF VCS TO BE MERGED AND NUMBER OF VCS ON THE LIST | | | | |
|---|---|---|---|---|
| 4 (5) | VC-1 | VC-2 | VC-3 | VC-4 |
| 3 (2) | VC-5 | VC-6 | | |
| 2 (3) | VC-7 | VC-8 | VC-9 | |

→ THE NUMBER OF VCS TO BE MERGED IS 4
→ THE NUMBER OF VCS TO BE MERGED IS 3
→ THE NUMBER OF VCS TO BE MERGED IS 2

PACKET-TRANSMISSION CONTROL METHOD AND PACKET-TRANSMISSION CONTROL APPARATUS

BACKGROUND OF THE INVENTION

The present invention relates to a packet-transmission control method and a packet-transmission control apparatus. More particularly, the present invention relates to a packet-transmission control method and a packet-transmission control apparatus wherein those virtual connections in a list having a large number of VCs to be merged are given a high priority in merge processing.

When an IP (Internet Protocol) network is constructed by using an ATM (Asynchronous Transfer Mode), a problem arises as to how a connectionless IP packet can be transmitted by using a virtual connection of the ATM, which is a connection oriented technology. The virtual connection is abbreviated hereafter simply as VC.

According to one technique, VCs are stretched in a mesh form from all origin networks to all end-point networks. With this technique, at an origin, an IP packet is transmitted through a VC linked to an end-point network corresponding to a destination IP address of the IP packet. This technique can be readily implemented with ease by using only existing technologies. Since the number of required VCs is a value on the order of the 2nd power of the number of networks, however, this technique gives rise to a problem of scalability.

In order to solve the problem of scalability, there is another technique wherein VCs are provided in a tree form starting from each end-point network to all origin networks, instead of being provided in a mesh form. Even with this technique, at an origin, an IP packet is transmitted through a VC corresponding to a destination IP address of the IP packet. At a VC merge point on the tree where a plurality of VCs are merged into a single VC, this IP packet is transferred from the VC the IP packet has been using so far to another. Eventually, the IP packet can reach the end-point network as expected. With this technique, since it is not necessary to carry out branch processing during the transmission of an IP packet, processing by a router is not required, allowing the processing to be performed at only an ATM layer.

In the following description, an apparatus for carrying out processing to transfer an IP packet coming from one of a plurality of incoming VCs to a continuation VC is referred to as a VC merger. A VC merger can be incorporated in an ATM switch or provided externally. In the processing to transfer an IP packet coming from one of a plurality of incoming VCs to a continuation VC, there is encountered a problem as to how an IP packet is divided into smaller cells in the ATM prior to the transfer.

In each VC, the order of cells is maintained even if a cell is lost and a new cell is never inserted into a position between any 2 consecutive cells. The format of an IP packet placed on a plurality of cells is clean on the premise that the order of cells is maintained and a new cell is never inserted into a position between 2 cells. For this reason, when cells coming from a plurality of VCs are merged into a series of cells flowing through a VC, the merge processing has to be carried out in IP-packet units instead of cell units. Otherwise, a packet can not be transmitted correctly. In addition, if the number of queues that can be used for VC merging is smaller than the number of VCs obtained as a result of merging, VCs to be merged are determined on a first-come-first-served basis.

A cell used as an ATM transfer unit comprises a header of 5 bytes in length and data of 48 bytes in size to give a fixed total length of 53 bytes. On the other hand, an IP packet comprises a header of 20 bytes in length and a data portion. The maximum length of the header is 60 bytes, including options. The IP packet has a variable length of up to 65,535 bytes, including the variable-length header and data. A format of data placed on cells is referred to as an AAL (ATM Adaptation Layer). At the present time, type 1, type ¾ and type 5 of the AAL are defined.

In general, an IP packet is placed on cells according to the AAL5. Typical processing is explained as follows.

First of all, at a 1st step, a header and a trailer are added before and after an IP packet. Speaking accurately, this processing is beyond the range of the AAL5 and follows RFC (Request for Comments) 1,483. It should be noted that an RFC is TCP/IP specification or service standard disclosed through a server on the Internet with an address of (http://ds.internic.net/) by the IETF (Internet Engineering Task Force), an Internet Research and Development Institute. Each RFC has a serial number assigned thereto for identification of the contents of the RFC.

Then, at a 2nd step, a trailer is appended by using a technique known as an AAL5 CPCS (Common Part Convergence Sublayer). A trailer includes information on the length and a 32-bit CRC (cyclic redundancy check) code. The total length is thus a multiple of 48 bytes. This is referred to hereafter as a frame. Subsequently, at a 3rd step, this frame is placed on ATM cells in 48-byte units.

A certain bit of a cell conveying the tail of a frame, specifically, a PTI user signaling bit, is set to 1. In other cells, this bit is reset to 0. The above processing, accurately speaking, pieces of processing carried out at the 2nd and 3rd steps, are processing for the AAL5.

Typical processing to extract an AAL5 frame from a series of ATM cells is described as follows. First of all, data of cells is stored in a buffer till the last cell of the AAL5 frame arrives. The last cell is indicated by a specific bit therein showing that the cell is the last cell. In the case of the last cell, the specific bit is set to 1. Then, the length and the CRC code are checked. If an abnormality is detected, the frame is discarded. If no abnormality is detected, on the other hand, the processing is completed.

When IP data is placed on the ATM, the maximum IP length is limited in many cases. In accordance with RFC 1626, the maximum IP length is set at 9,180 bytes in many cases. The header of an ATM cell includes a 12-bit or 8-bit VPI (Virtual Path Identifier) and a 16-bit VCI (Virtual Channel Identifier). An ATM switch has a plurality of input/output ports. At an input port, with the VPI and the VCI used as keys, a destination table is searched for an output port, a new VPI and a new VCI. In general, the VPI and the VCI are used as array subscripts of the destination table. Then, the VPI and VCI fields of the cell header are rewritten and the cell is transferred to the output port found in the search. At an output port, cells accumulated in a queue to be output are sequentially output one cell after another by referring to priority levels assigned to the cells and other information. In some cases, only the VPI is considered. In this case, the ATM switch outputs cells while rewriting the VPI field of each of the cells. A path through which a cell is transmitted on the basis of only the VPI thereof is referred to as a VP (Virtual Path).

In many cases, ATM switches are connected to each other by optical fibers. The MTU (Maximum Transfer Unit), that is, the maximum size of a transferable packet, of an Ethernet communication line with a transmission speed of 100 Mbps (Megabit per second) or the so-called 100-base TX, is 1,500 bytes as is the case with a 10-Mbps Ethernet communication line. The MTU of a gigabit Ethernet communication line is also 1,500 bytes. In the case of the gigabit Ethernet communication line, however, a packet with a length of about 9,000 bytes can also be transmitted. There has been a proposal to make the 100-base TX also capable of transmitting a packet with a length of about 9,000 bytes. Thus, for the time being, the upper limit of the packet size is practically 1,500 bytes. It is quite within the bounds of possibility that a packet with a size of about 9,000 bytes will be commonly used in the future.

Problem to be Solved by the Invention

However, the number of queues that can be used for virtual connections (VCs) is limited and may thus be smaller than the number of VCs to be merged. In this case, VCs to be merged are determined on a first-come-first-served basis, giving rise to a problem that the number of VCs can not be reduced with a high degree of efficiency.

SUMMARY OF THE INVENTION

It is thus an object of the present invention to address the problem described above to allow the number of VCs to be reduced with a high degree of efficiency.

According to a first aspect of the present invention, there is provided a packet-transmission control method for controlling transmission of packets including, a judgment step of forming a judgment as to whether or not the number of queue buffers that can be used for VC merging is smaller than the number of VCs to be merged in processing to merge a plurality of virtual connections into 1 virtual connection, and a merging step of merging virtual connections by giving a high priority to those virtual connections in a list having a large number of virtual connections to be merged in accordance with an outcome of the judgment formed at the judgment step.

According to a second aspect of the present invention, there is provided a packet-transmission control apparatus for controlling transmission of packets including a judgment means for forming a judgment as to whether or not the number of queue buffers that can be used for VC merging is smaller than the number of VCs to be merged in processing to merge a plurality of virtual connections into 1 virtual connection, and a merging means for merging virtual connections by giving a high priority to those virtual connections in a list having a large number of virtual connections to be merged in accordance with an outcome of the judgment formed by the judgment means.

In the packet-transmission control method for controlling transmission of packets and the packet-transmission control apparatus for controlling transmission of packets according to the present invention, a judgment as to whether or not the number of queue buffers that can be used for VC merging is smaller than the number of VCs to be merged is formed in processing to merge a plurality of virtual connections into 1 virtual connection; and virtual connections are merged by giving a high priority to those virtual connections in a list having a large number of virtual connections to be merged in accordance with an outcome of the formed judgment.

BRIEF DESCRIPTION OF THE DRAWINGS

Embodiments of the present invention will be described by referring to the following diagrams wherein:

FIG. 8 is a diagram showing a typical data format of an LLC encapsulation in an RFC1483;

FIGS. 9A and 9B are diagrams showing data formats of an AAL5 CPCS;

FIG. 10 is a diagram showing the format of a packet prior to division into cells;

FIG. 12 is a table showing the standard of an SDH and transfer speeds;

FIG. 13 is a flowchart representing the procedure of processing to continuously output cells of a frame;

FIG. 21 is a diagram showing lists [1] and a list [2].

DETAILED DESCRIPTION OF THE PREFERRED EMBODIMENTS

Figure 1:
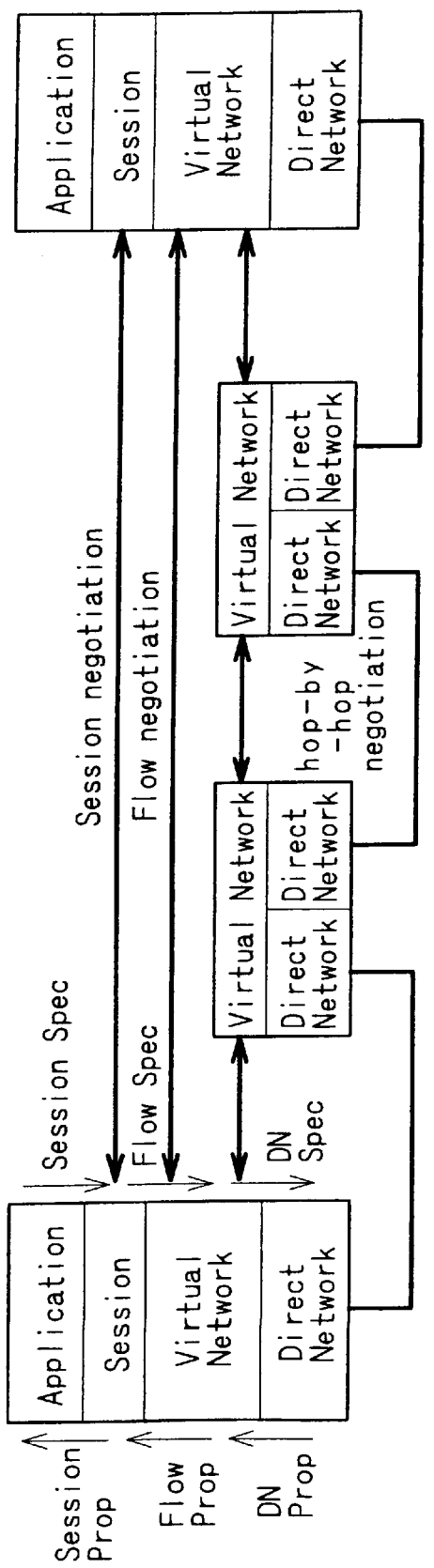
FIG. 1 is a diagram showing an example of an AMInet architecture.

The present invention will become more apparent from a careful study of the following detailed description of some preferred embodiments with reference to the accompanying diagrams.

First of all, an AMInet architecture developed by the applicants of the present patent to provide an environment of a wide-area high-speed network is explained.

AMInet is a next-generation network architecture for solving problems of the contemporary network architecture. The AMInet architecture has characteristics including assurance of a connection oriented QoS (Quality of Service), multicast support, separation of identifiers from addresses, non-inter-end control and dynamic construction of an optimum protocol stack by negotiation. Aimed at an FTTH (Fiber to the Home) era, a network based on the AMInet architecture is provided not only for wide-area backbones, but also for home networks.

At the present time, a new network architecture aimed at fusion of communication and broadcasting is in demand. An OSI (Open Systems Interconnection) reference model and the Internet were designed about 20 years ago. They are neither capable of satisfying a demand for implementation of communication of continuous media such as moving pictures and sound and a demand for mobile and transparent communication required by the advent of portable computers nor capable of keeping up with effective utilization of very-high-speed communication technologies represented by the ATM (Asynchronous Transfer Mode).

Even though the Internet has been extended in order to meet the demands and keep up with the technologies cited above, the Internet architecture has, among other issues, the following unsolved problems:

an IP (Internet Protocol) datagram is used as a base;

characteristics of a data link are not taken into consideration;

identifiers are not clearly separated from addresses; and traffic only between end nodes is controlled.

In the present state of the connection to the Internet, large corporations are linked to the Internet by dedicated lines all the time, while small companies and homes use intermittent connection based on dial-up operations. Even in the case of the all-time connection, the line speed is of the order of 1.5 Mbps (megabits per second). As for the intermittent connection, the line speed is about 128 kbps (kilobits per second). By merely migrating from the intermittent connection to the all-time connection, the state of utilization of the Internet at homes changes considerably. If the line speed is further increased to a value composed of different digits from the present one, applications that can not be imagined at the present time will probably arrive on the scene.

Aimed at an era in which homes and corporations are linked to an ultra-high-speed network all the time in a symmetrical or semi-symmetrical form due to implementation of the FTTH and an xDSL (Digital Subscriber Line), the AMInet architecture is provided to solve the real problems of the Internet architecture. For more information on the FTTH, refer to "Toward the Service-Rich Era," IEEE Communications Magazine, Vol. 32, No. 2, authored by T. Miki in February 1994 and, for more information on the xDSL, refer to "Systems Considerations for the Use of xDSL Technology for Data Access," IEEE Communications Magazine, Vol. 35, No. 3, authored by G. T. Hawley in March 1997. The AMInet architecture and a system model for it are explained as follows.

From now on, the number of applications utilizing continuous media such as moving pictures and sound is conceived to keep increasing more and more. From the technological point of view, it is necessary to enable assurance of the quality of services (QoS) with respect to things such as a usable bandwidth, a usable transmission delay, variations (jitters) in transmission delay and an error rate.

On the other hand, a demand for transmission of data in volume such as those of images for medical treatments, newspapers and whole cinema films is expected to rise in the future. In such applications, data has to be transmitted at a speed that is as high as possible. From the technological point of view, it is necessary to develop a technology for effectively utilizing the band of an ultra-high-speed network in order to solve the so-called "long fat pipe" problem.

In the present state of communication, mostly, one-to-one communications are carried out. In the future, however, there will be other forms of communication such as multicast communication wherein the same data is transmitted to a plurality of communication partners in mobile transparent communication with mobile partners. As an architecture, there is a problem as to how to handle a relation between identifiers and addresses which, from the technological point of view, makes it necessary to establish a scalable path control system. In addition, assurance of the QoS and high-speed and large-volume communication are also in demand as well.

In order for a computer network to serve as an infrastructure of communication, it is necessary to implement absolutely assured security. In the AMInet architecture, security protection, prevention of alterations, authentication and prevention of traffic analyses among nodes are subjects to be implemented. However, things such authentication of a user is in the category of an application program and is thus not a subject to be implemented by the AMInet architecture.

Even if a network having the characteristics described above is constructed, smooth migration by the user from the Internet to the network can not be implemented unless the network is compatible with the Internet. The new network has to be constructed in such a way that the user is not aware of whether the one the user is using is the new network or the Internet.

Next, characteristics of the AMInet architecture are explained. In comparison with the shortcomings of the Internet described above, the AMInet architecture has the following characteristics.

dynamic construction of an optimum protocol stack, negotiations between nodes at the same hierarchical level and between upper and lower hierarchical levels in the same node, assurance of the connection oriented QoS, separation of a node identifier from a node address, non-inter-end control and architecture independent of communication media.

According to the OSI hierarchical model, a hierarchical level makes a function of a level subordinate thereto abstract in order to conceal details of the function. A real wide-area network comprises a variety of data links having different characteristics. In addition, in the case of a mobile node, the characteristic of the data link changes in the course of communication in some cases. By negotiation between upper and lower hierarchical levels, the upper level becomes capable of knowing the characteristic and the state of the lower level, hence, becoming capable of dynamically adapting itself to a communication boundary.

With a fixed protocol stack, a function overlapping different hierarchical levels is executed wastefully in some cases. In the AMInet architecture, however, an optimum protocol stack is dynamically constructed. For example, if all data links between end nodes assure reliability, a function to assure reliability in a transport layer can be eliminated. In addition, in a case wherein the characteristic of the data link is different only for a portion of a communication path such as a case in which a node connected by a radio LAN is communicating with another node in a wide-area network, a special protocol stack is constructed for nodes at both ends of the data link to absorb the differences in data-link characteristic. As a result, communication between the ends can be carried out with a high degree of efficiency.

In order to construct an optimum protocol stack, negotiation is utilized. Normally, a negotiation is carried out between nodes at the same hierarchical level. In the AMInet architecture, however, negotiations between upper and lower hierarchical levels in the same node are also carried out as well.

The Internet uses an IP datagram as a base and, even though the QoS is assured, there is no concept of establishing logical connections clearly at network layers. This is because emphasis is placed on a failure-proof characteristic against failures that may occur in the network. In the case of the AMInet architecture, on the other hand, emphasis is placed on the assurance of the QoS. In order to assure the QoS, logical connections are deliberately utilized.

In the Internet, an IP address represents the location of a node as well as plays the role of an identifier of the node. For this reason, mobile transparent communication with a mobile node can not be established. In addition, processing to protect security becomes complicated. Also with regard to an IPv6, a next-generation IP, the node identifier issue was discussed at length. However, the concept of the node identifier was not adopted. In the AMInet architecture, on the other hand, the identifier and the address of a node are clearly separated from each other, allowing mobile and transparent communication to be established and the amount of security processing to be reduced. For more information on the mobile and transparent communication, refer to "VIP: A Protocol Providing Host Mobility," CACM, Vol. 37, No. 8, authored by F. Teraoka, K. Uehara, H. Sunahara and J. Murai in August 1994.

In addition, in the Internet, processing such as flow control, error recovery and congestion control is carried out at the transport layer of an end node. In the case of the congestion control, it is considered to be effective to carry out congestion recovery rather between a node at which congestion occurs, that is, a router, and a transmitting node.

A characteristic common to the AMInet and Internet is introduction of hierarchical layers shared by all nodes in order to make the architecture independent of data links. In order to sustain compatibility with the Internet, even in the AMInet architecture, in essence, IPs (strictly speaking, the IPv4 and the IPv6) are adopted as the so-called network layers. By dynamic construction of a protocol stack, however, an IP layer may be bypassed in some cases in the course of communication of data.

Next, a protocol hierarchy is explained. In the AMInet architecture, a protocol stack is dynamically constructed. A hierarchical structure comprising functional layers of a protocol module is shown in FIG. 1. The lowest layer is a direct network layer. The direct network layer is a layer providing a communication function which allows direct communication to be established between nodes through a single transmission medium. The direct network layer corresponds to a data-link layer and a physical layer of the OSI reference model. To put it concretely, the Ethernet and ATM protocols correspond to this direct network layer.

FIG. 1 is a diagram showing the AMInet architecture. As shown in the figure, a virtual network layer is placed on the direct network layer. A network comprising a plurality of transmission media virtually appears as a single transmission medium. A communication function among nodes connected to the single virtual transmission is provided. A protocol stack is dynamically constructed at this hierarchical level which corresponds to a network layer and a transport layer of the OSI reference model.

A session layer is placed on the virtual network layer. The session layer makes the communication function provided by the virtual network layer abstract, offering the abstract communication function to an application layer, the uppermost layer in the hierarchy. The function of the session layer is different from that of a session layer of the OSI reference model. By making the communication function abstract, a QoS parameter can be specified as an expression other than a number such as "a moving picture with a television quality" and a communication partner can be specified as a service name in place of the address or the identifier of a node. In addition, a connection of the virtual network layer can appear to exist as a connection continuously even if the connection is temporarily broken by a failure or movement of a mobile node. The uppermost application layer is not an object of the AMInet project.

In FIG. 1, horizontal and vertical arrows represent a connection between hierarchical layers at the same level and a connection between upper and lower hierarchical layers respectively. A negotiation taking place between hierarchical layers at the same level can be a flow negotiation or a session negotiation between end nodes, or an inter-hope negotiation between adjacent nodes. A negotiation taking place between upper and lower hierarchical layers is a request to deliver a demand from the upper hierarchical layer to the lower hierarchical layer or an indication to transmit a state of the lower hierarchical layer to the upper hierarchical layer. By such negotiations, a communication environment between end nodes and the characteristic of the direct network layer are known, allowing an optimum protocol stack to be constructed.

Figure 2:
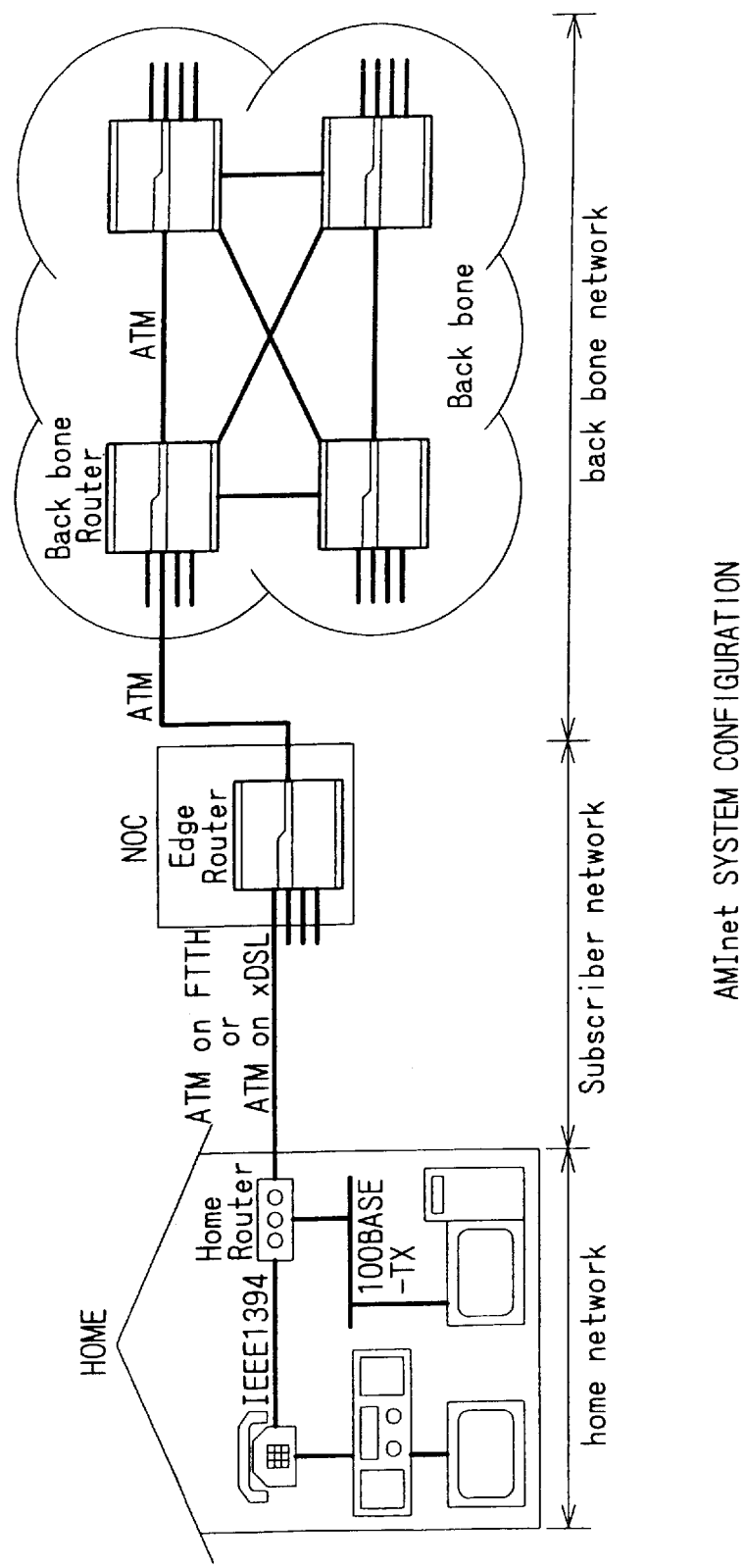
FIG. 2 is a diagram showing a typical system configuration of the AMInet architecture.

Next, the system configuration is explained. In the AMInet architecture, in addition to the wide-area network, the home network is also taken into consideration. A system configuration assumed by the AMInet project is shown in FIG. 2. As shown in the figure, the entire network comprises 3 portions, namely, a backbone network, a home network and a subscriber network linking the backbone and home networks.

FIG. 2 is a diagram showing an example of the system configuration. The backbone is an assumed large-scale network covering the entire area of Japan. The backbone network makes use of ATM ultra-high-speed communication technologies. The ATM network serving as the backbone comprises ATM switches (and optical fibers). An ATM switch having a functional extension peculiar to the AMInet architecture such as high-speed signaling is referred to as a backbone router.

On the periphery of the backbone, an edge router is provided. Much like a backbone router, an edge router has a functional extension peculiar to the AMInet architecture. The edge router is in a position to gather subscriber lines and connect them to the backbone. The edge router also handles bills for subscribers and performs shaping of traffic incoming to the backbone. As a subscriber line, an FTTH optical fiber is used. As an alternative, a technology such as an ADSL (Asymmetric Digital Subscriber Line) making use of copper wires may probably be adopted. In either case, the ATM network reaches homes.

A home router is placed at a home. The home router is assumed to have an ATM serving as an interface with an external network. As an interface with an internal network, the home router is assumed to have a component conforming to the IEEE1394 or Ethernet (10 Mbps/100 Mbps) specifications. The IEEE1394 specifications allow the assurance of the QoS such as band allocation, offering merits such as a capability of communication with an assured QoS between end nodes. In addition, in the future, AV equipment will be provided with an IEEE1394 interface. Thus, in addition to computers, AV equipment can probably be connected to the network as well.

Next, ATM control through the IP for real-time communication in the AMInet architecture is explained. An ASP (AMInet Setup Protocol), a resource reservation setup protocol adopted in the backbone and a wide-area network assumed in the AMInet project, is explained. By focusing on the flexibility and the adaptability of the IP as well as the ATM serving as a line oriented data link and by integrating them, the ASP is aimed at implementation of fast and flexible reservation of a resource. The ASP does not utilize the ordinary ATM signaling. Instead, the ASP dynamically establishes ATM VCs by utilizing messages transferred in accordance with the IP. ASP characteristics, the present state of the implementation of a prototype and integration with QoS routing are explained as follows.

By virtue of progress in the FTTH (Fiber to the Home) and xDSL (digital subscriber line) technologies, an all-time connected high-speed network which is different from the dial-up system can be used also at homes. In such an environment, it is necessary to implement applications such as integrated services (IS) or transfers of files with large sizes with a high degree of efficiency. In particular, reservation of resources is effective for implementation of the IS. By introducing the reservation of resources, the network is capable of assuring the QoS. In addition, in the case of a bulk data transfer application, the network itself can be utilized with a high degree of efficiency by extending functions of the TCP.

The following is a description of the AMInet Setup Protocol (ASP), a resource reservation protocol in the AMInet architecture which provides an environment of a large-area and high-speed network. The ASP effectively integrates the ATM VC technology with the IP in order to provide a resource reservation function. In addition, the ASP also keeps up with high-speed resource reservation and dynamic variations in QoS as well as takes integration with QoS routing into consideration.

Next, the resource reservation is explained. Resource reservation is required in the future in the Internet in order to keep up with the IS. Introduction of the resource reservation leads to introduction of a concept of connections to the Internet which originally serves as a packet exchange. As a result, the use of an ATM as a data link provides good matching and the ATM allows the QoS to be assured with ease.

Even in the AMInet architecture, the ATM draws attention, being treated the IP data links. This document mainly describes implementation using the ATM. At the present time, the IETF, an Internet standardization body, is carrying on standardization of a proposed standard as an RSVP (Resource Reservation Protocol). With the RSVP used, however, in the current prescribed Internet draft, a system of using an ATM SVC (Switched Virtual Channel) is assumed. It is thus necessary to establish a VC (virtual channel) by utilizing ATM signaling. Since the present ATM-signaling processing is a heavy process which takes much time, however, it is quite within the bounds of possibility that a bad effect on the application and the network exists. There is also proposed a system wherein processing required for signaling is divided into pieces of sub-processing which are carried out in parallel.

In addition, there is also research being conducted to reduce the magnitude of an overhead caused by a crank bank by reserving resources on a plurality of paths at the same time. At the present time, if the SVC is used with an ATM switch which can be purchased in general, the time it takes to process signaling reaches a value of an order making it inevitably impossible to use the ATM switch in ordinary data communication such as the ordinary IP communication. This is mainly because the ATM switch is designed for audio data, that is, the ATM switch is designed with the connection setup time in the related-art telephone taken as a reference. In addition, by merely utilizing the contemporary signaling, the QoS can not be changed dynamically.

In the AMInet architecture, in order to solve the problems described above, the highly flexible IP is used in a transfer of a setup message and, by directly establishing an ATM VC, the QoS can be assured.

The AMInet setup protocol (ASP) is a resource reservation setup protocol which functions in a wide-area network, particularly, in an environment comprising routers based on the AMInet architecture. The AMInet architecture comprises a backbone and an edge router on the periphery of the backbone. The backbone includes routers each having the ATM switching functions. Resources to be reserved include an ATM VC and a queue used in packet processing. Particularly, in the case of integration with the ATM, the ordinary ATM signaling is not utilized. Instead, a VC is established in a router having the ATM functions. Since a setup message is transmitted by using the IP, high-speed resource reservation can be implemented. Thus, a VC known as an SVC is not normally used at all in an ATM switch. Instead, a VC is established dynamically by a message using the IP. Such a VC is referred to as a PVC-on-demand. By using the ASP, a VC is dynamically established or discontinued in a way different from the ordinary SVC.

Even if the ASP is used, data is transmitted by the ordinary IP. Here, an IP packet is subjected to mapping into a reserved resource. For this reason, the ASP is capable of easily keeping up with a migration from an application used so far to a new application which will probably be introduced in the future. This mapping is carried out by referring to pieces of information such as source and destination IP addresses, source and destination port numbers and a protocol identifier field. Ordinary IP traffic, that is, best-effort (BE) traffic goes through a default BE VC set in advance. A resource reserved by using the ASP is not affected by BE traffic. In addition, taking factors such as the economy of resources into consideration, flows collected in a VC are capable of coexisting without being affected by BE traffic.

Next, a flexible setup mechanism is explained. In order to utilize resources with a high degree of efficiency and to make a reservation meeting a demand of an application, a resource can be reserved in a variety of forms in the ASP. In the Internet and an ATM environment, various types of applications exist. The applications include various kinds of data transmission, from broadcasting to interactive communication transmitting data in both directions, such as television conferences, remote diagnoses, video-on-demand (VoD) and multicasting using an MBone. In each of the applications, it is necessary to map a QoS parameter into a resource reservation parameter at a lower hierarchical level in an efficient as well as scalable manner.

In the case of the VoD, for example, it is not necessary to establish a VC between a server and a client in both directions. This is because data always flows from the server to the client. In a case of using the ASP, another dedicated VC can be used for exchanges of messages peculiar to the ASP, exchanges of control signals other than transfers of data required by the application and exchanges required by a layer at an upper level such as the transport layer even though the exchanges can be carried out by merely using the default BE VC. In the case of the VoD, an exchange of control signals is typically requested by the client typically for changing a movie in the course of watching the movie. An ASP message is transmitted through the default BE VC or a specified dedicated VC.

In the case of the interactive television-conference application, on the other hand, a bi-directional VC is required. The ASP keeps up with both the one-directional VC and the bi-directional VC. In addition, in the case of an interactive application, the ASP supports an asymmetrical model wherein a QoS for upstream traffic can be set differently from a QoS for downstream traffic.

Much like the RSVP and the ST-2+ (Stream Transport Protocol-2+), the ASP allows a request for a resource reservation to be made by the receiving side or the transmitting side. Either the transmitting or receiving side has information on the QoS required for making a resource reservation in dependence on the application or the environment. In either case, the ASP allows setting to make all reservations through only 1 path. In addition, if necessary, it is possible to wait for a response message indicating completion of a resource reservation.

Figure 3:
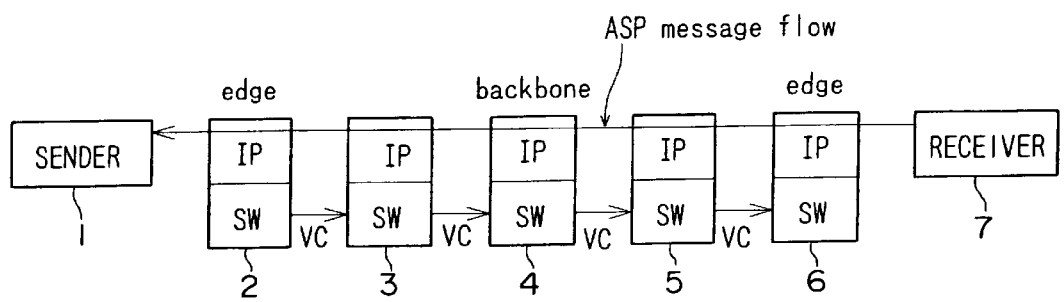
FIG. 3 is a diagram showing a case in which a receiving side issues a message conveying a request for a resource reservation.

FIG. 3 is a diagram showing a case in which the receiving side issues a message conveying a request for a general resource reservation. This case represents typically a video broadcasting application using the ASP. In this case, data is transmitted only from a server 1 on the transmitting side to a client 7 on the receiving side.

On the receiving side 7, first of all, a QoS parameter is interpreted. A VPI/VCI used in this connection is then determined and, if necessary, an ATM NIC (Network Interface Card) is set up. In addition, an ASP message including this information is created and transmitted to an edge router connected directly to the backbone. This message is transmitted by using the IP and processed at each IP hop. In the case shown in FIG. 3, when the message arrives at the edge router, a VPI/VCI parameter toward the receiving side is set in the router. The VPI/VCI is controlled individually in each node. In this way, the ASP message is transmitted in the upstream direction toward the transmitting side 1. In each of routers 2 to 6, a VC is set up in a direction the ASP message is transmitted and in the opposite direction. When this ASP message is transmitted to the transmitting side 1 and the reservation is virtually completed, if necessary, a response message not shown in the figure is transmitted to the receiving side 7. At this point of time, at least, at the backbone, a VC from the transmitting side 1 to the receiving side 7 is established. That is to say, by using the VC connecting edges, in transmission of data, the IP is cut through and communication can be carried out by using only the ATM.

FIG. 3 shows only one embodiment implementing a flexible setup procedure in an ASP. For example, there is also a case in which the transmitting side 1 has QoS information and the receiving side 7 issues a request for a reservation in a multicast application. In such a case, the receiving side 7 creates a message to request a VC by a 2nd path through which a response is returned. In addition, a bi-directional VC can also be established by only a 1st path.

Next, dynamic QoS changes are explained. In the ASP, since a setup mechanism of its own originality is used for establishing an ATM VC, it is not necessary to prepare other VCs in advance and the QoS of an already reserved resource can thus be changed. In addition, the application is capable of upgrading the service level with ease. In a migration simply from the BE to the IS, for example, the data flow can be re-mapped from the default BE VC into typically a new VC shown in FIG. 3.

Next, integration with QoS routing is explained. In the ASP, support of path selection by QoS routing when setting up a VC is taken into consideration. To put it concretely, in a reservation of a resource, a routing table at the related-art IP level is not utilized. Instead, information on paths is received from a module controlling a routing table of its own originality for a flow requiring the IS. A path differing from flow to flow can thus be utilized in accordance with a QoS request or the state of utilization of usable resources in the network.

In addition, the assumption that the related-art resource reservation protocol and the routing mechanism are independent of each other has been thought of so far. On the other hand, the ASP is aimed at integration with the QoS routing. The integration is implemented by feeding back information on resource reservations held by the ASP to the module of the QoS routing. In this way, a substitute path can be selected with ease in case a reservation ends in a failure. In addition, resources to be reserved can be distributed throughout the network so that the network as a whole can be utilized with a high degree of efficiency without concentrating the resource reservation on one path.

Figure 4:
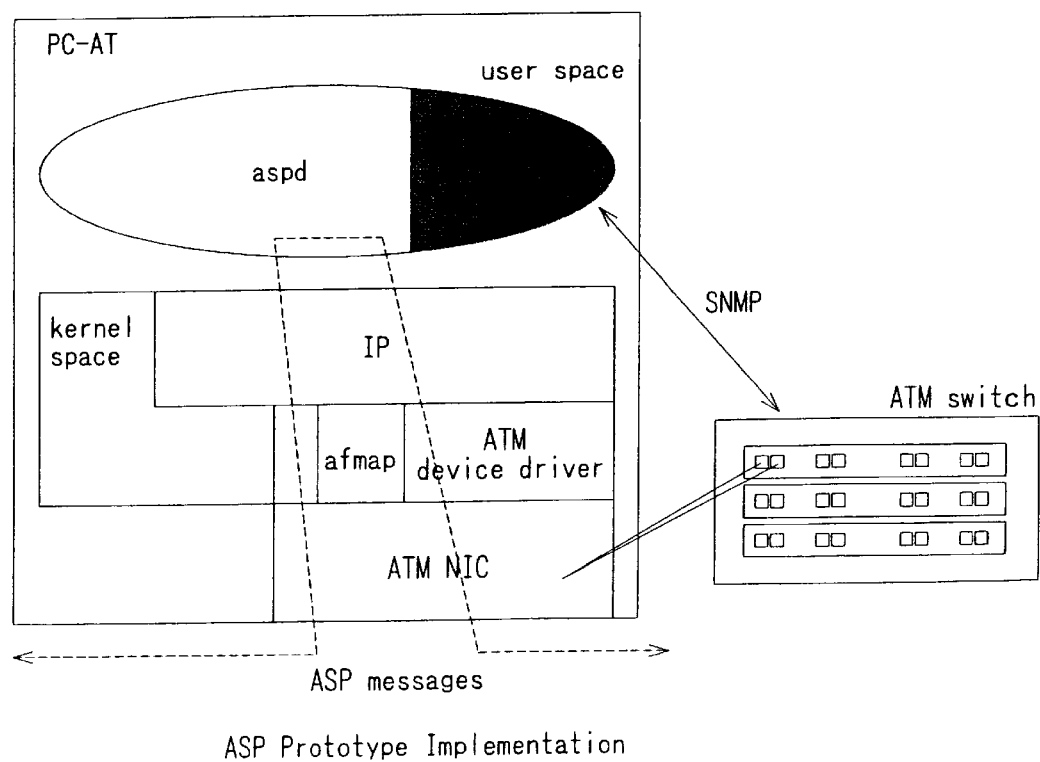
FIG. 4 is a diagram showing a typical configuration of a prototype of an ASP.

Next, implementation of a prototype is explained. The ASP is implemented in a user space as a daemon process (aspd) of UNIX. The prototype is operating in FreeBSD 2.2.1 and integrated with a library (swct1 lib) for controlling an ATM switch and a module (afmap) for setting up an ATM NIC. (Refer to FIG. 4.) At the present time, 3 types of routers are supported. The home router has an 100Base-T Ethernet interface and an ATM interface. At the present time, the edge router is implemented as a router having a plurality of ATM interfaces. The backbone router comprises an ATM switch and a PC including an IP engine for controlling the ATM switch. The present prototype utilizes an ATM-interface card for a PCI bus made by Adaptec Corporation and Efficient Networks Corporation and a Fore ASX-200WG ATM switch. An ASP message is implemented by using a raw IP.

The backbone router makes use of the switch control library described earlier to set a PVC-on-demand in the switch provided thereto. A flow requiring the IP is mapped into a VC of the CBR. By creating a one-for-many multicast VC in an ATM switch, the ATM keeps up with multicast communication. Joins by leaves and resource reservation are supported.

If the scalability of an ATM resource such as mainly an identifier like a VCI is taken into consideration, mapping flows into VCs for each application gives rise to poor efficiency. By utilizing the ASP, however, flows can be organized dynamically into a VC with ease. Nevertheless, it is necessary to study a reference for organizing flows into a VC in the future.

A QoS routing module is being designed at the present time. Its effectiveness is being studied by simulation.

Figure 5:
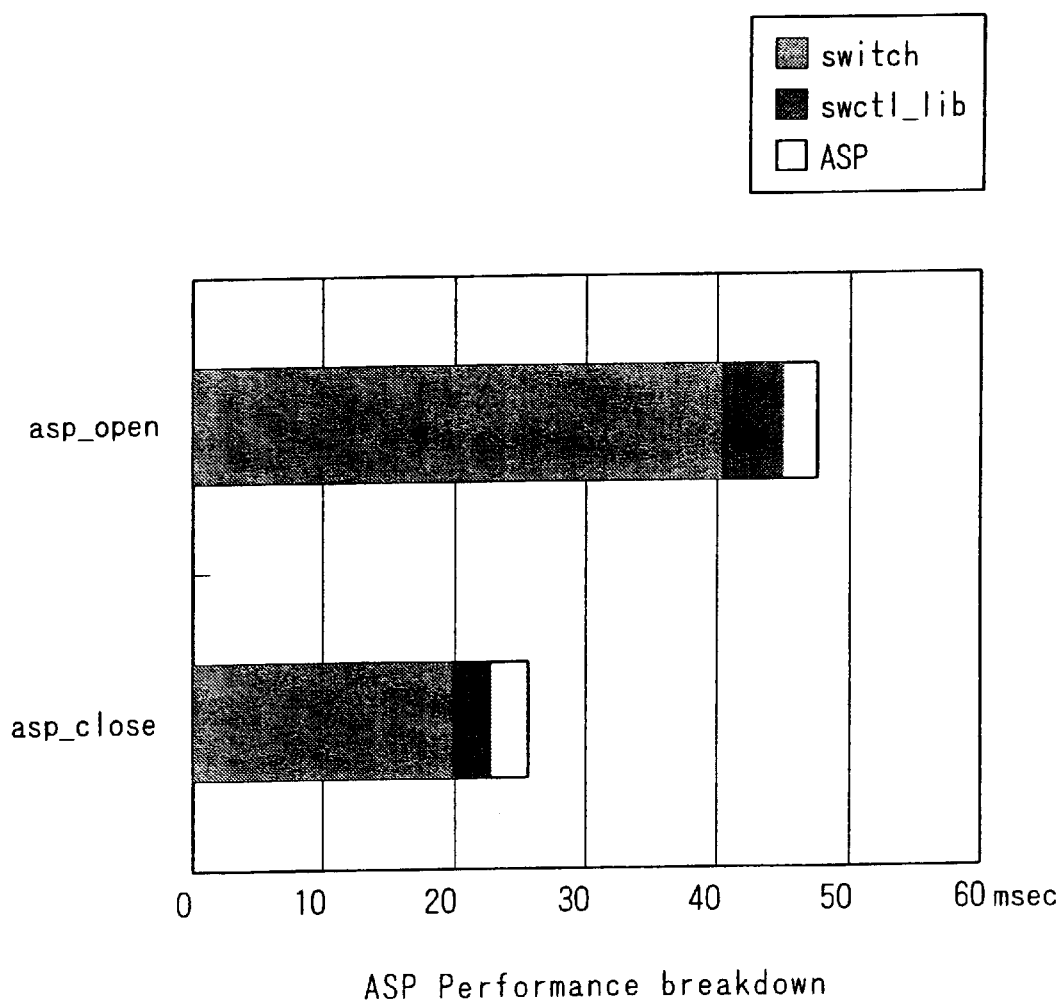
FIG. 5 is a diagram showing performance to establish and release a resource reservation in the present implementation of the ASP.

Next, the performance of the prototype is explained. FIG. 5 is a diagram showing performance to establish and release a resource reservation in the present implementation. The asp_open parameter represents the length of a time it takes to issue a request for a resource reservation and to complete the reservation normally. The asp_open time includes a period of time to wait for a response indicating successful completion of the resource reservation. The asp_close parameter is the opposite of asp_open. That is to say, asp_close represents the length of a time it takes to release a resource reservation. Measurement of these values represents a case in which a request from a receiving party is issued to unicast communication when a router is provided between a single transmitting party and the receiving party. The transmitting and the receiving parties are each provided with an ATM NIC. A period of time denoted by notation ATM in the figure includes processing required for the ASP and work to map a flow for the NIC. The swit1_lib parameter represents the length of a processing time required in the ATM switch control library described earlier.

The switch parameter represents the length of a time required for setting up an ATM switch by an SNMP by using the ATM switch control library.

It is obvious from FIG. 5 that the processing to set up the ATM switch by the SNMP denoted by notation switch occupies most of the overhead. The time it takes to carry out this processing is very unstable and also varies from switch to switch. The length of the time can be any value in the range 40 msec to 110 msec. Even in a stable case, it takes at least 40 msec to 50 msec to carry out the processing. The switch in use is not designed for such usage. In addition, since the internal structure of the switch is not disclosed, the unstable operation can not be studied. As a result, it is quite within the bounds of possibility that the VC setup processing or the SNMP processing inside the switch or both is slow. With the present performance, processing can be carried out only to set up 20 to 25 VCs per second. If the internal processing of the switch can be speeded up, however, it is obvious that the performance can be improved substantially. At the present time, integration of the ASP with hardware is being studied. It is predicted that such integration will allow several hundreds of VCs to be set up in 1 second.

The resource-reservation protocol ASP in the AMInet architecture has been described. The ASP introduces a setup mechanism of its own originality, integrating the IP flexibility and the QoS assurance by ATM VCs. As a result, dynamic QoS changes, integration with QoS routing and a flexible setup procedure can be implemented. In addition, it is also obvious that a high-speed setup procedure can also be realized by implementation of a prototype. Integration of the prototype with hardware of its own originality, flow aggregation and implementation of QoS routing are planned in the future.

Figure 6:
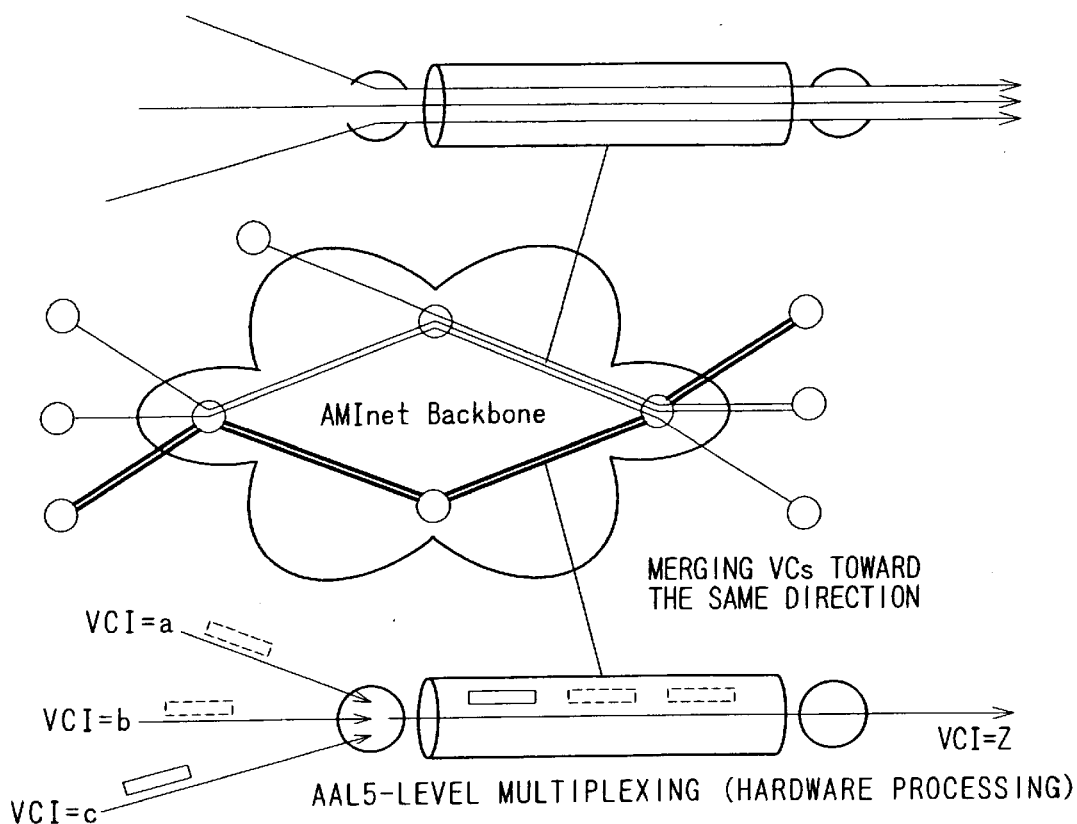
FIG. 6 is a diagram showing an overview of best-effort communication.

FIG. 6 is a diagram showing a concept of best-effort communication. As shown in the figure, at each merge point of VCs, a plurality of VCs are merged into a single VC, allowing a packet to be transmitted to a desired end-point network eventually. For example, by multiplexing of hardware at the AAL5 level, cells coming from a plurality of VCs can be transferred to the single VC.

Figure 7:
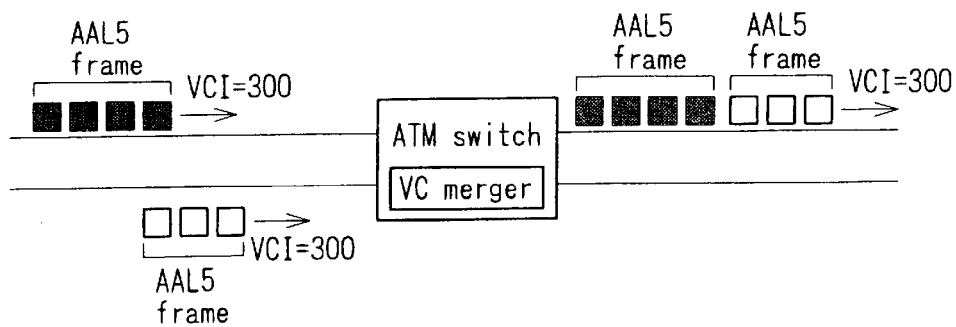
FIG. 7 is a diagram showing an operation to merge VCs into one VC.

FIG. 7 is a diagram showing the operation of a VC merger 22 (output means and control means). A VC is set up for each connection. In a large-scale network, the number of VCs increases. The VC merger 22 merges AAL5 frames toward the same direction into the same VC. In this example, two sets of frames with a VCI of 300 are merged by the merger 22 and transferred to the same VC.

FIG. 8 is a diagram showing a typical data format of an LLC encapsulation in the RFC1483, a multiprotocol encapsulation over ATM adaptation layer 5. Fields LLC, OUI and Ether Type compose a header. The field following the header is data.

FIGS. 9A and 9B are diagrams showing data formats of an AAL5 CPCS (Common Part Convergence Sublayer) of the ATM adaptation layer (AAL). To be more specific, FIG. 9A is a diagram showing the format of a last cell. As shown in the figure, the last cell comprises data and padding data of a total of 40 bytes followed by an appended 8-byte trailer. The trailer comprises a 1-byte UU (User-to User Indication), a 1-byte CPI (Common Part Indication), a 2-byte length and a 4-byte CRC-32. On the other hand, FIG. 9B is a diagram showing the format of any other cell. As shown in the figure, a cell other than the last cell is 48 bytes or fewer in size.

FIG. 10 is a diagram showing the format of a packet prior to division into cells. As shown in the figure, a packet comprises a header, an IP, padding data and a trailer.

Figure 11A:
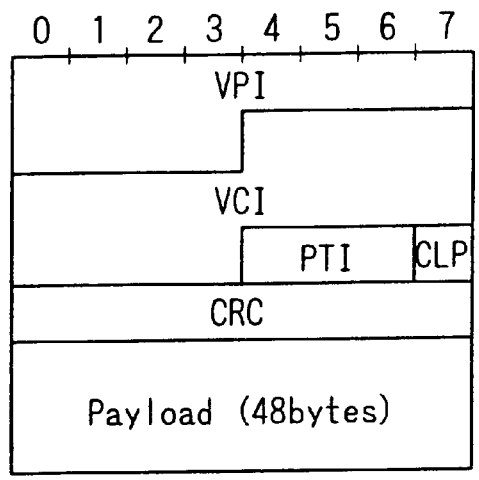
FIGS. 11A and 11B are diagrams showing formats of an NNI and a UNI.
Figure 11B:
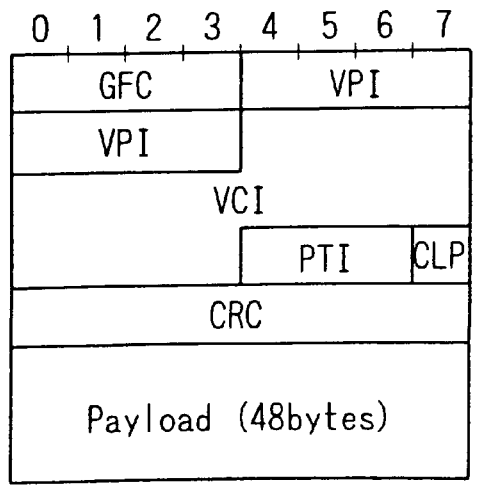

FIG. 11A is a diagram showing the format of an NNI (Network-Network Interface). The first 12-bit field is a VPI (Virtual Path Identifier). The next 16-bit field is a VCI (Virtual Channel Identifier). The next 3-bit field is a PTI (Payload Type Identifier). The next 1-bit field is a CLP (Cell Loss Priority). The next 8-bit field is a CRC (Cyclic Redundancy Check) and the last 48-bit field is a payload. FIG. 11B is a diagram showing the format of a UNI (User-Network Interface). The first 4 bytes are a GFC (Generic Flow Control) field. The next 8-byte field is a VPI (Virtual Path Identifier) and the remaining fields are the same as the fields of the format shown in FIG. 11A.

FIG. 12 is a table showing the standard of an SDH (Synchronous Digital Hierarchy) and transfer speeds. As shown in the figure, the SDH comprises OC-1 (Optical Channel 1 at optical carrier level 1 with the world's first optical speed standard), OC-3 (corresponding to STM-1 (Synchronous Transfer Module 1) of the SDH (Synchronous Digital Hierarchy)) with a transfer speed of 155.52 Mbps equal to 3 times that of OC-1, OC-12 with a transfer speed of 622.08 Mbps equal to 4 times that of OC-3, OC-24 with a transfer speed of 1,244.16 Mbps equal to 2 times that of OC-12 and OC-48 with a transfer speed of 2,488.32 Mbps equal to 2 times that of OC-24.

The following is a description of a procedure of processing to suppress a gap between the first cell and the last cell of the same frame to a value not exceeding a predetermined value in a fiber or a VP with reference to a flowchart shown in FIG. 13. As shown in the figure, the procedure begins with a step S1 at which a predetermined value is set in a predetermined counter. The flow of the procedure then goes on to a step S2 to form a judgment as to whether or not there is a cell of another frame to be output with a higher priority than a frame which is about to be output, that is, a judgment as to whether or not a cell with a high priority of typically reserved traffic has arrived. If the outcome of the judgment indicates that a cell of another frame with a higher priority exists, the flow of the procedure proceeds to a step S4 to form a judgment as to whether or not the contents of the counter are equal to the number of cells in the frame being output. If the outcome of the judgment indicates that the contents of the counter are not equal to the number of cells, the flow of the procedure continues to a step S5 at which the cell with a high priority is output.

If the outcome of the judgment formed at the step S4 indicates that the contents of the counter are equal to the number of cells, on the other hand, the flow of the procedure goes on to a step S8 at which the remaining cells are output, taking precedence of any traffic and the processing is finished.

If the outcome of the judgment formed at the step S2 indicates that a cell of another frame with a higher priority does not exist, on the other hand, the flow of the procedure proceeds to a step S3 at which a cell of the frame being output is output. After the processing carried out at the step S3 or S5 has been completed, the flow of the procedure continues to a step S6 at which the contents of the counter are decremented by 1. Then, the flow of the procedure goes on to a step S7 to form a judgment as to whether or not the operation to output cells has been completed.

If the operation to output cells has not been completed, the flow of the procedure returns to the step S2 at which the execution of the pieces of processing is repeated starting with that of the step S2. If the operation to output cells has been completed, on the other hand, the processing is finished.

As described above, in a VC merger 22 at which cells arrive next, the expected value of a period of time required by all cells of a frame to arrive can be shortened, allowing a delay incurred in the VC merger 22 to be suppressed. In addition, in the VC merger 22, the average of the number of frames waiting for all cells to arrive can be reduced. As a result, since the maximum of the period of time required by all cells of a frame to arrive can be decreased, the timeout time can be suppressed to a small value. Moreover, the average of the number of queues to be controlled and the size of a required buffer can also be reduced as well.

In addition, cells of the same frame can be output to the same fiber or in the same VP consecutively. To put it in detail, a minimum best-effort band is allocated and, in the range of the band, cells of an equal priority in the same frame can be output consecutively one cell after another. In this way, if another VPI/VCI or another VCI arrives prior to the outputting of the last cell, a frame that has not been received completely can be discarded immediately. As a result, the average of the number of queues to be controlled and the size of a required buffer can be reduced.

In addition, packets can be classified into different types by the value of a specific bit or values of a plurality of bits in the VPI or VCI and the ATM switch 21 or it is possible to make the VC merger 22 carry out different operations depending on the type of a packet. That is to say, VPI and VCI control tables can be provided separately for best-effort traffic and resource-reservation traffic. For example, packets are distinguished from each other by whether the value of a specific bit of the 16 VCI bits is 0 or 1.

As a result, a cell of traffic with a reserved resource can be detected with ease so that it is possible to implement processing to let cells of anti-jitters traffic such as mainly continuous media pass through the same fiber or the inside of a VP without buffering.

Figure 14:
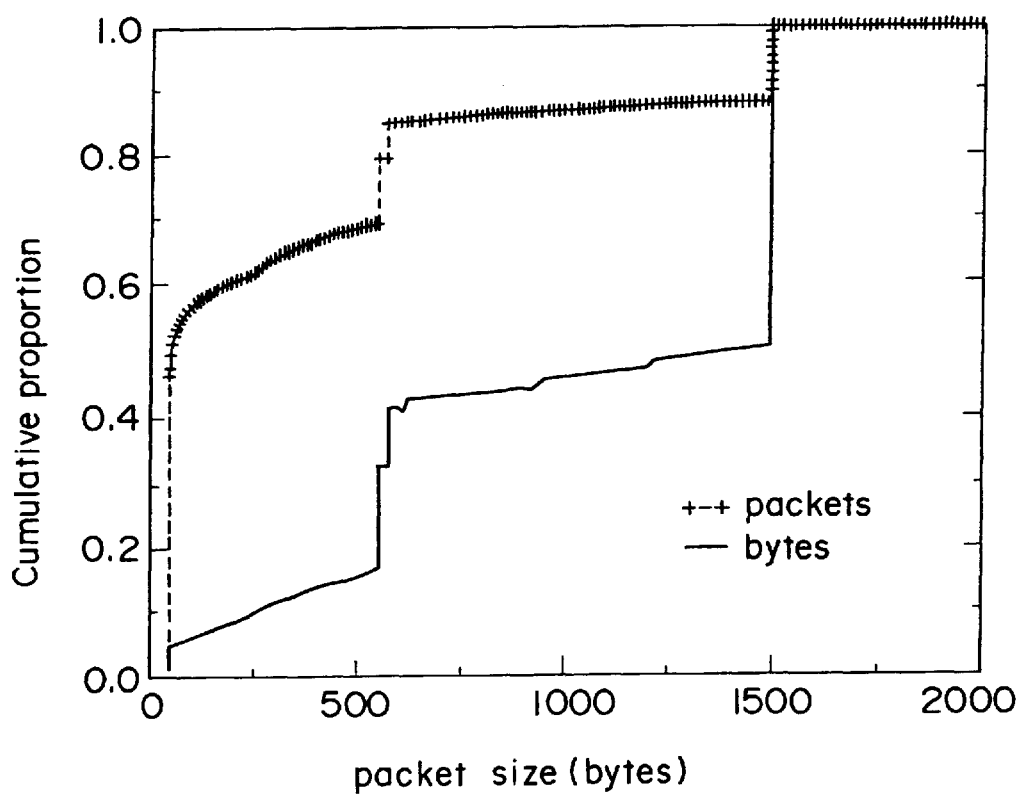
FIG. 14 shows a graph representing a distribution of the packet length.

In addition, in case the size of a packet exceeds a maximum packet length transferable by an Ethernet cable used in the backbone, the packet is split. In this case, the maximum value of the size of a frame can be set typically at 2,048 bytes. The size of 2,048 bytes can be found from a graph shown in FIG. 14.

This graph is acquired from an URL of htt p://www.nlanr.net/NA/Learn/packetsizes.html, showing a distribution of the packet length in a OC3 backbone of an MCI in the U.S.A. for a period of 5 minutes at around 16:00 on Jul. 25, 1997. The horizontal axis represents the packet length and the vertical axis represents the ratio of the number of packets with a length not exceeding the packet length on the horizontal axis to the number of all packets. For example, for a packet length of 1,500 bytes, the ratio of the number of packets with a length not exceeding 1,500 bytes to the number of all packets is 99.9996%. For a packet length of 2,048 bytes, on the other hand, the ratio of the number of packets with a length not exceeding 2,048 bytes to the number of all packets is 99.9998%.

It is obvious from the above discussion that, even if the maximum length of a packet is set at 2,048 bytes, there is almost no affected packet. As a result, the length of time it takes to carry out timeout processing can be reduced and the storage capacity of the required buffer can also be decreased as well. Thus, the maximum value of a delay incurred in store-and-forward processing of a frame can be suppressed to a small value, allowing the processing of the buffer to be carried out with ease.

Figure 15:
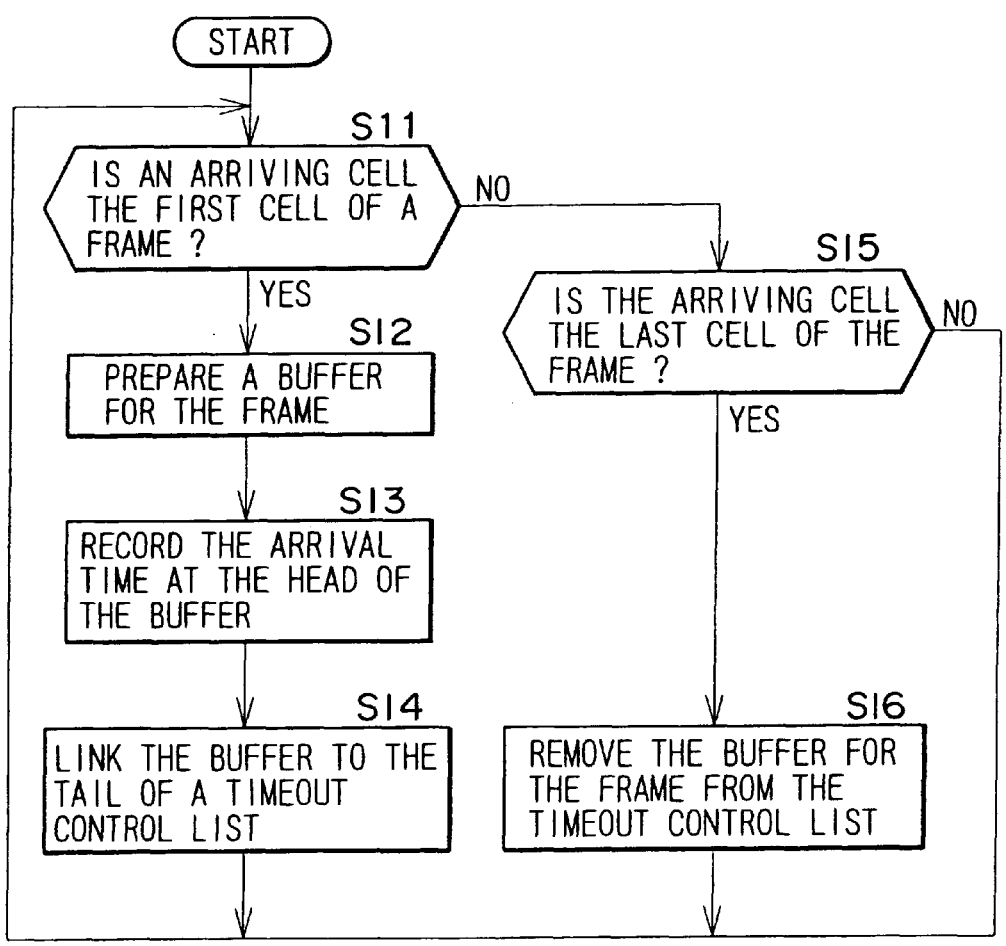
FIG. 15 is a flowchart representing the procedure of timeout processing.
Figure 16:
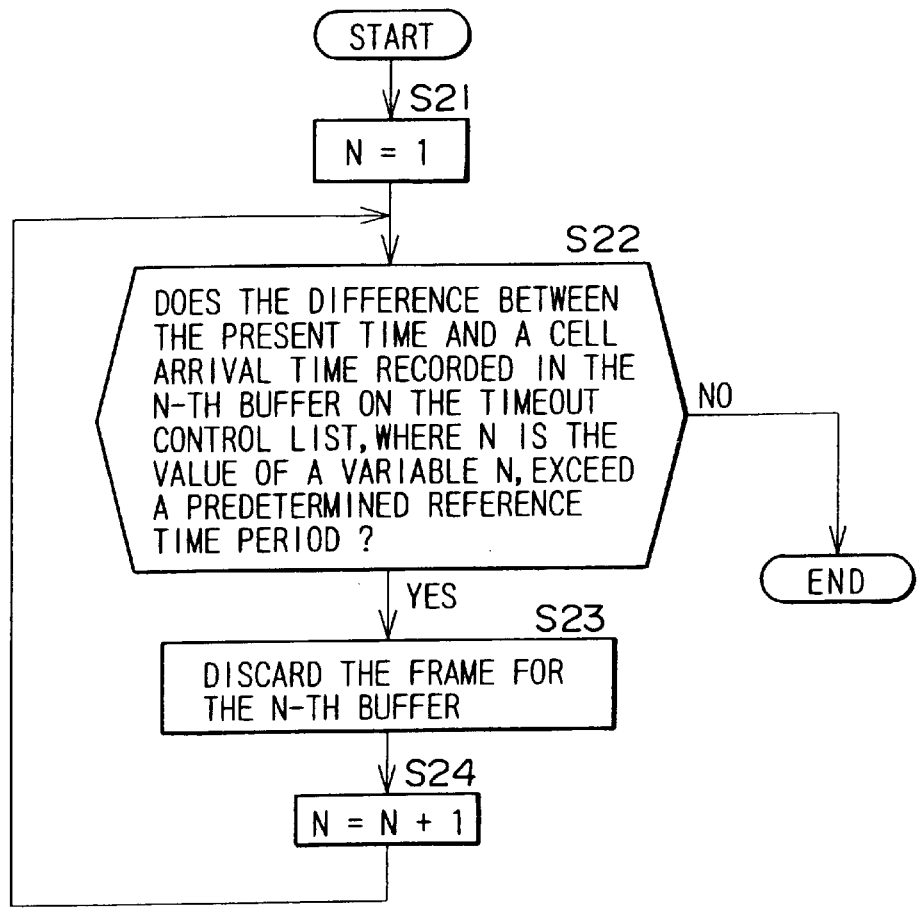
FIG. 16 is a flowchart representing the procedure of timeout processing.
Figure 17:
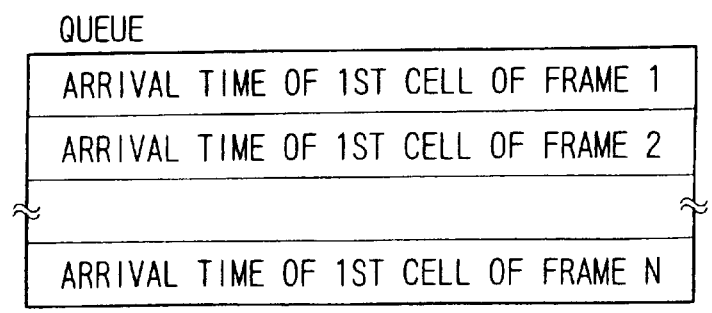
FIG. 17 is a diagram showing a typical configuration of a timeout control list.

Next, the timeout processing is explained by referring to flowcharts shown in FIGS. 15 and 16. The flowchart shown in FIG. 15 begins with a step S11 to form a judgment as to whether or not an arriving cell is the first cell of a frame. If the outcome of the judgment indicates that the arriving cell is the first cell of a frame, the flow of the processing goes on to a step S12 at which a buffer is prepared for the frame. Then, the flow of the processing proceeds to a step S13 at which the arrival time is recorded at the head of the buffer. The flow of the processing then continues to a step S14 at which the buffer is linked to the tail of a timeout control list as shown in FIG. 17.

As the processing carried out at the step S14 is completed, the flow of the processing returns to the step S11 to repeat the execution of the pieces of processing starting with that of the step S11.

If the outcome of the judgment formed at the step S11 indicates that the arriving cell is not the first cell of a frame, on the other hand, the flow of the processing goes on to a step S15 to form a judgment as to whether or not an arriving cell is the last cell of the frame. If the outcome of the judgment indicates that the arriving cell is the last cell of the frame, the flow proceeds to a step S16 at which the buffer for the frame is removed from the timeout control list. When the processing carried out at the step S16 is completed or if the outcome of the judgment formed at the step S15 indicates that the arriving cell is not the last cell of the frame, the flow of the processing returns to the step S11 to repeat the execution of the pieces of processing starting with that of the step S11.

Next, the procedure of processing to discard a frame is explained by referring to FIG. 16. As shown in the figure, the procedure begins with a step S21 at which a value of 1 is set in a predetermined variable N. The flow of the procedure then goes on to a step S22 to form a judgment as to whether or not the difference between the present time and a cell arrival time recorded in the nth buffer on the timeout control list, where n is the value of the variable N, exceeds a predetermined reference time period.

If the outcome of the judgment indicates that the difference between the present time and the cell arrival time recorded in the nth buffer on the timeout control list exceeds the predetermined reference time period, the flow of the procedure proceeds to a step S23 at which the frame for the nth buffer is discarded. Then, the flow of the procedure continues to a step S24 at which the value of the variable N is incremented by 1. Subsequently, the flow of the procedure returns to the step S22 to repeat the execution of the pieces of processing starting with that of the step S22.

If the outcome of the judgment formed at the step S22 indicates that the difference between the present time and the cell arrival time recorded in the nth buffer on the timeout control list does not exceed the predetermined reference time period, that is, if the frame is found out to be a frame requiring no timeout processing, on the other hand, the timeout processing is finished.

As described above, the timeout processing is carried out not for each VC but only for 1 timeout control list. As a result, the overhead of the timeout processing can be reduced.

Figure 18:
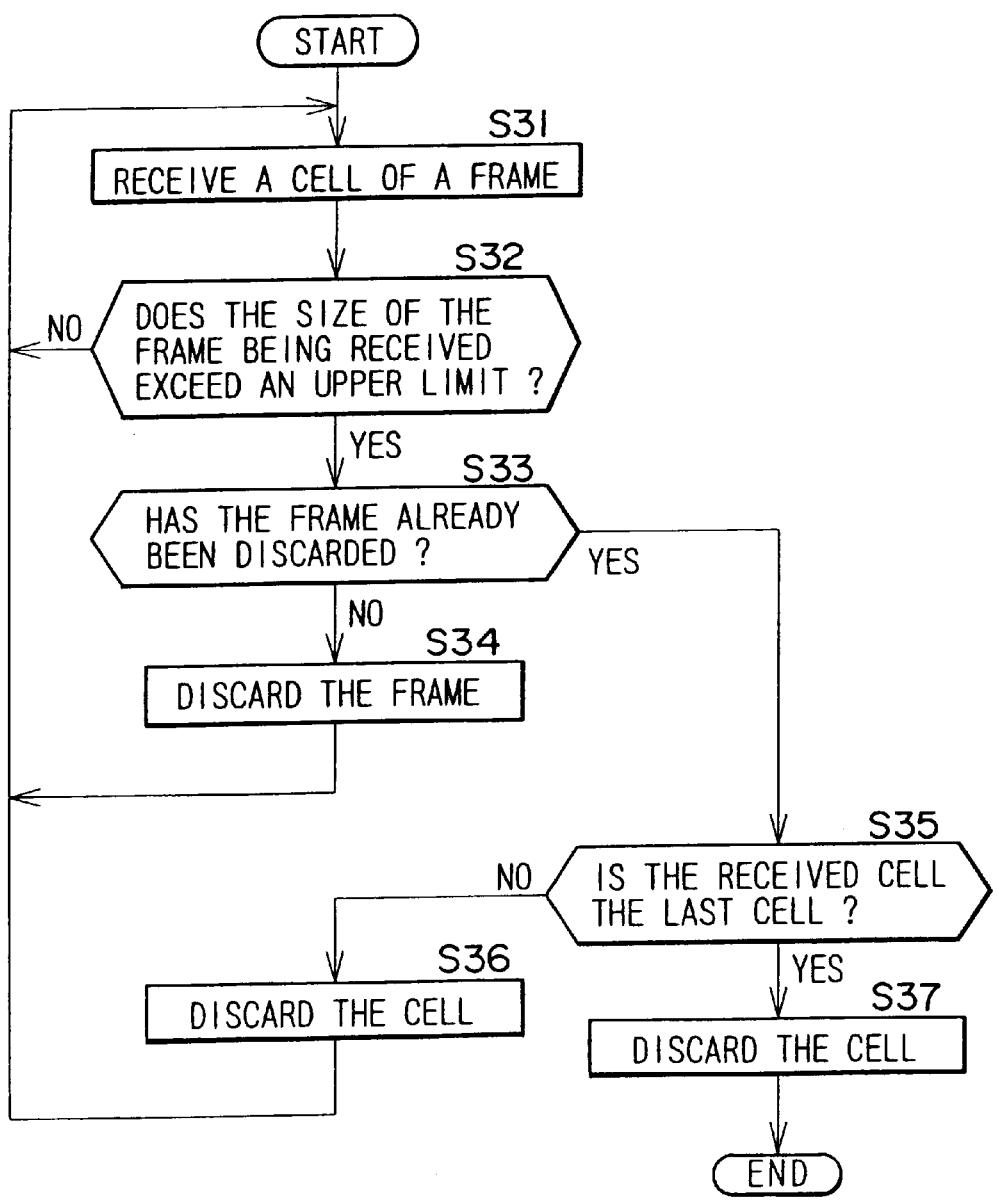
FIG. 18 is a flowchart representing the procedure of processing which is carried out in case the last cell of a frame is dropped.

The following is a description of the procedure of processing, which is carried out in case the last cell of a frame is dropped, with reference to a flowchart shown in FIG. 18. As shown in the figure, the procedure begins with a step S31 at which a cell of a frame is received. The flow of the procedure then goes on to a step S32 to form a judgment as to whether or not the size of the frame being received exceeds an upper limit. If the outcome of the judgment indicates that the size of the frame being received does not exceed the upper limit, the flow of the procedure returns to the step S31 to repeat the execution of the pieces of processing starting with that of the step S31.

If the outcome of the judgment formed at the step S32 indicates that the size of the frame being received exceeds the upper limit, on the other hand, the flow of the procedure goes on to a step S33 to form a judgment as to whether or not the frame has already been discarded. If the outcome of the judgment indicates that the frame has not been discarded, the flow of the procedure proceeds to a step S34 at which the frame is discarded. Then, the flow of the procedure returns to the step S31 to repeat the execution of the pieces of processing starting with that of the step S31.

If the outcome of the judgment formed at the step S33 indicates that the frame has already been discarded, on the other hand, the flow of the procedure proceeds to a step S35 to form a judgment as to whether or not the received cell is the last cell. If the outcome of the judgment indicates that the received cell is not the last cell, the flow of the procedure proceeds to a step S36 at which the cell is discarded. Then, the flow of the procedure returns to the step S31 to repeat the execution of the pieces of processing starting with that of the step S31. If the outcome of the judgment formed at the step S35 indicates that the received cell is the last cell, on the other hand, the flow of the procedure proceeds to a step S37 at which the cell is discarded to finish the processing.

For example, the size of a frame being received exceeds an upper limit which is set at 2 kB. In this case, the last cell is regarded as a dropped cell and the frame is discarded. Then, all received cells can be discarded till the next last cell is received.

In addition, in the case of the AAL5, the expected number of cells is computed from the length field. If the computed number of cells is found different from the number of cells composing the frame, the cells can be discarded. Then, a frame, the further transfer of which will be wasteful, can be discarded.

Figure 19:
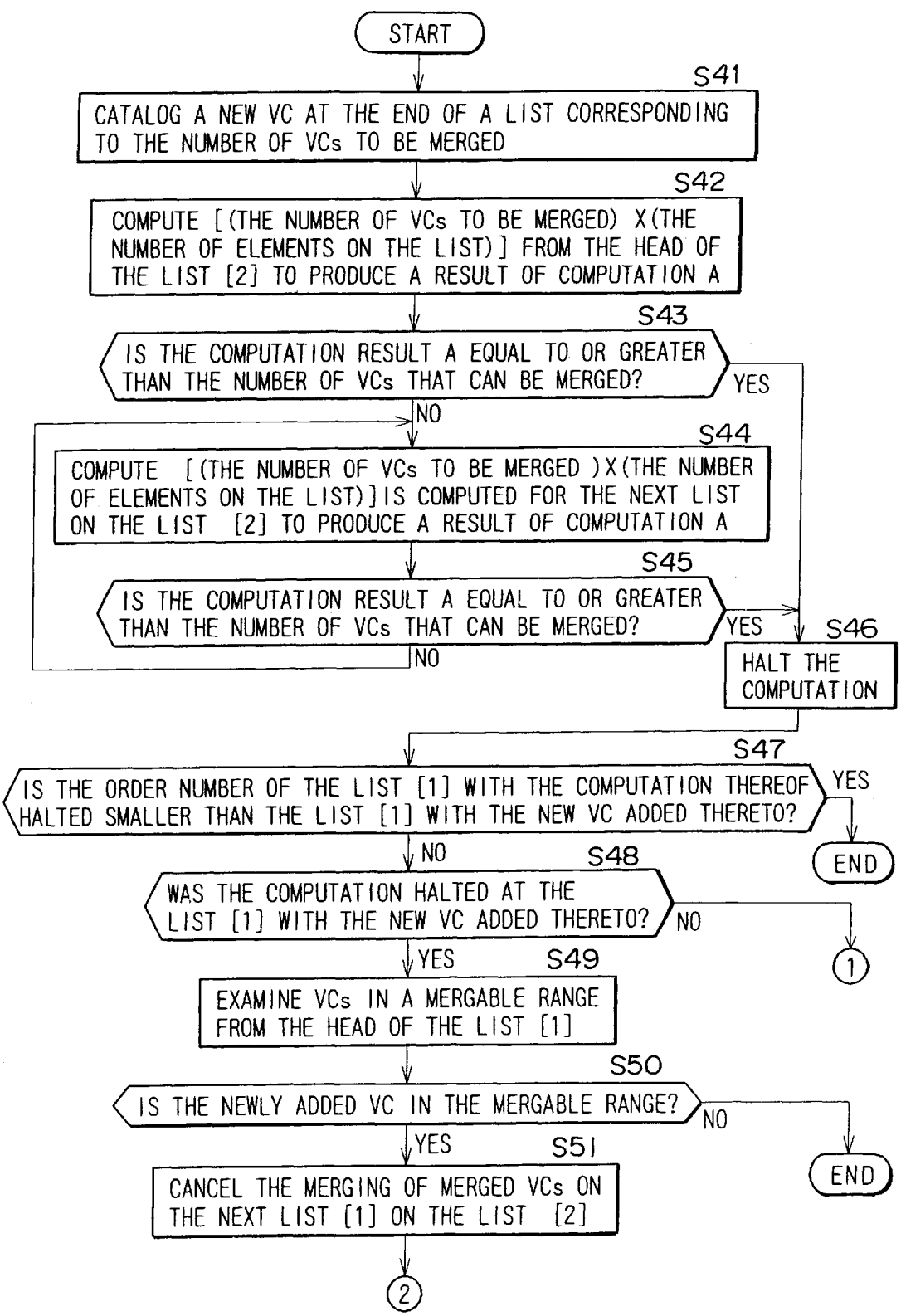
FIG. 19 is a flowchart representing the procedure of merge processing in which those virtual connections in a list having a large number of VCs to be merged is given a high priority.
Figure 20:
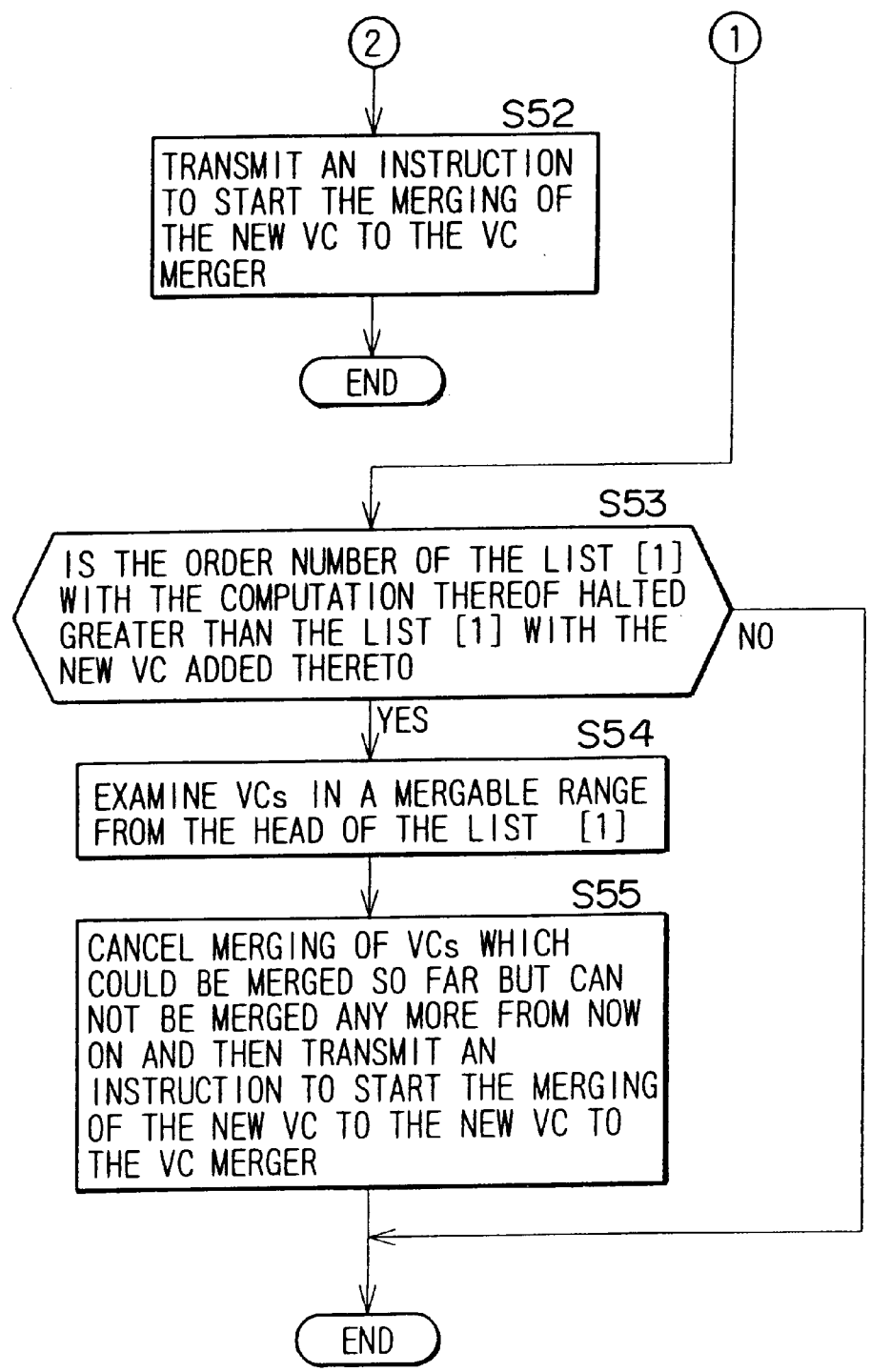
FIG. 20 is a flowchart representing the procedure of merge processing in which those virtual connections in a list having a large number of VCs to be merged is given a high priority.

The following is a description of the procedure of merge processing, in which those virtual connections in a list having a large number of VCs to be merged is given a high priority, with reference to flowcharts shown in FIGS. 19 and 20. As shown in FIG. 21, first of all, a list [1] is created for each number of VCs to be merged. Subsequently, the lists [1] are arranged in an order of decreasing numbers of VCs to be merged to form a list [2]. Then, when a VC to be newly merged is set up, the following processing is carried out.

As shown in FIG. 19, the flowchart begins with a step S41 at which a new VC is cataloged at the end of a list corresponding to the number of VCs to be merged. The flow of the procedure then goes on to a step S42 at which [(the number of VCs to be merged)×(the number of elements on the list)] is computed from the head of the list [2] to produce a result of computation A.

Then, the flow of the procedure proceeds to a step S43 to form a judgment as to whether or not the computation result A is equal to or greater than the number of VCs that can be merged. If the outcome of the judgment indicates that the computation result A is smaller than the number of VCs that can be merged, the flow of the procedure continues to a step S44 at which [(the number of VCs to be merged)×(the number of elements on the list)] is computed for the next list on the list [2] to produce a result of computation A. Then, the flow of the procedure goes on to a step S45 to form a judgment as to whether or not the computation result A is equal to or greater than the number of VCs that can be merged.

If the outcome of the judgment indicates that the computation result A is smaller than the number of VCs that can be merged, the flow of the procedure returns to the step S44 to repeat the execution of the pieces of processing starting with that of the step S44. If the outcome of the judgment formed at the step S43 or S45 indicates that the computation result A is equal to or greater than the number of VCs that can be merged, on the other hand, the flow of the procedure goes to the step S46 at which the computation is halted. The flow of the processing then goes on to a step S47.

At the step S47, the current list [1], for which the computation was halted, is examined to form a judgment as to whether or not the order number of the list [1] with the computation thereof halted is smaller than the list [1] with the new VC added thereto. If the outcome of the judgment indicates that the order number of the list [1] with the computation thereof halted is not smaller than the list [1] to which the new VC was added, the flow of the procedure goes on to a step S48 to form a judgment as to whether or not the computation was halted at the list [1] with the new VC added thereto. If the outcome of the judgment indicates that the computation was not halted at the list [1] with the new VC added thereto, the flow of the procedure proceeds to a step S53. If the outcome of the judgment indicates that the computation was halted at the list [1] with the new VC added thereto, on the other hand, the flow of the procedure proceeds to a step S49.

At the step S49, VCs in a mergable range from the head of the list [1] are examined. The flow of the procedure then goes on to a step S50 to form a judgment as to whether or not the newly added VC is in the mergable range. If the outcome of the judgment indicates that the newly added VC is in the mergable range, the flow of the procedure continues to a step S51.

At the step S51, the merging of merged VCs on the next list [1] on the list [2] is canceled. Then, the flow goes on to a step S52 at which an instruction to start the merging of the new VC is transmitted to the VC merger 22 before finishing the processing. If the outcome of the judgment formed at the step S50 indicates that the newly added VC is not in the mergable range, on the other hand, the processing is finished.

At the step S53, the current list [1], for which the computation was halted, is examined to form a judgment as to whether or not the order number of the list [1] with the computation thereof halted is greater than the list [1] with the new VC added thereto. If the outcome of the judgment indicates that the order number of the list [1] with the computation thereof halted is not greater than the list [1] to which the new VC was added, the flow of the procedure goes on to a step S54 at which VCs in a mergable range from the head of the list [1] are examined. Subsequently, the flow of the procedure proceeds to a step S55 to cancel merging of VCs which could be merged so far but can not be merged any more from now on and then transmit an instruction to start the merging of the new VC is transmitted to the VC merger 22.

The processing is completed at the step S55 or at the step S53 when the outcome of the judgment formed at the step S53 indicates that the order number of the list [1] with the computation thereof halted is greater than the list [1] to which the new VC was added.

As described above, by carrying out merge processing that lets those virtual connections in a list having a great number of VCs to be merged take precedence, the number of VCs can be reduced effectively.

In the embodiment described above, the present invention is applied to an ATM network. It should be noted, however, that the present invention can also be applied to other networks.

In a packet-transmission control method and an apparatus according to the present invention, cells of a frame are output with predetermined timing, and the timing for outputting said cells is controlled so as to make a gap between a point of time to output a first cell of the frame and a point of time to output a last cell of the frame equal to or smaller than a predetermined reference value.

As a result, the processing in an operation to output a frame can be carried out with ease.

What is claimed is:

1. A packet-transmission control method for controlling transmission of packets, said method comprising:

a judgment step of forming a judgment as to whether or not the number of queue buffers that can be used for VC merging is smaller than the number of VCs to be merged in processing to merge a plurality of virtual connections into 1 virtual connection; and a merging step of merging virtual connections by giving a high priority to one with a large number of virtual connections to be merged in accordance with an outcome of said judgment formed at said judgment step.

2. A packet-transmission control method for controlling transmission of packets according to claim 1 wherein said packets are transmitted through an ATM network.

3. A packet-transmission control apparatus for controlling transmission of packets, said apparatus comprising:

a judgment means for forming a judgment as to whether or not the number of queue buffers that can be used for VC merging is smaller than the number of VCs to be merged in processing to merge a plurality of virtual connections into 1 virtual connection; and a merging means for merging virtual connections by giving a high priority to one with a large number of virtual connections to be merged in accordance with an outcome of said judgment formed by said judgment means.

4. A packet-transmission control apparatus for controlling transmission of packets according to claim 3 wherein said packets are transmitted through an ATM network.

5. A method for merging virtual connections, the method comprising:

determining a maximum number of virtual connections that can be merged;

determining a priority for each set of virtual connections to be merged; and merging a set of virtual connections having the highest priority, if the set is smaller than the maximum number.

6. A packet-transmission control method for controlling transmission of packets, the method comprising:

determining whether the number of queue buffers available for merging a set of virtual connections (VCs) is sufficient to support a merging operation for merging the set of virtual connections into a single virtual connection; and merging the virtual connections, if the number of queue buffers is sufficient, by giving priority to a set of virtual connections having a highest priority designation.

7. A packet-transmission control apparatus for controlling transmission of packets, the apparatus comprising:

a judgement means for determining whether the number of queue buffers available for merging a set of virtual connections (VCs) is sufficient to support a merging operation for merging the set of virtual connections into a single virtual connection; and a merging means for merging the virtual connections, if the number of queue buffers is sufficient, by giving priority to a set of virtual connections having a highest priority designation.

8. The method of claim 5, wherein determining the maximum number of virtual connections that can be merged comprises determining an amount of available queue buffers.

* * * * *